United States Patent
Wadehn

(10) Patent No.: US 8,172,531 B2
(45) Date of Patent: May 8, 2012

(54) PLAIN BEARING FOR A WIND TURBINE BLADE AND METHOD OF OPERATING A WIND TURBINE HAVING SUCH A PLAIN BEARING

(75) Inventor: Jörg Wadehn, Trige (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/987,596

(22) Filed: Jan. 10, 2011

(65) Prior Publication Data

US 2011/0188988 A1    Aug. 4, 2011

(51) Int. Cl.
*F04D 29/26* (2006.01)
*F16C 32/06* (2006.01)

(52) U.S. Cl. ............ 416/27; 416/41; 384/118; 384/100; 384/111

(58) Field of Classification Search .................... 416/41, 416/42, 27, 205, 207; 384/100, 107, 108, 384/109, 110, 111, 112, 113, 114, 115, 116, 384/117, 118, 119, 120, 121, 123
See application file for complete search history.

(56) References Cited

U.S. PATENT DOCUMENTS

| | | | |
|---|---|---|---|
| 3,387,899 A | 6/1968 | Hahn et al. | |
| 3,680,932 A | 8/1972 | Raimondi | |
| 3,708,215 A | 1/1973 | Wilcock et al. | |
| 4,029,434 A | 6/1977 | Kenney | |
| 4,072,372 A | 2/1978 | Korrenn et al. | |
| 4,371,216 A | 2/1983 | Suzuki et al. | |
| 4,834,559 A | 5/1989 | Kalvoda | |
| 5,743,657 A | 4/1998 | O'Reilly et al. | |
| 6,050,727 A | 4/2000 | Messmer et al. | |
| 6,186,061 B1 | 2/2001 | Burns et al. | |
| 6,623,164 B1 | 9/2003 | Gozdawa | |
| 6,739,756 B2 | 5/2004 | Miller | |
| 6,790,156 B2 | 9/2004 | Hösle | |
| 6,814,493 B2 | 11/2004 | Wobben | |
| 8,079,761 B1 * | 12/2011 | Wadehn et al. ............... 384/118 |
| 2008/0207389 A1 | 8/2008 | Fahrenbach et al. | |
| 2009/0074337 A1 | 3/2009 | Kashchenevsky | |
| 2009/0232429 A1 | 9/2009 | Stiesdal | |

FOREIGN PATENT DOCUMENTS

| | | |
|---|---|---|
| CN | 1904400 | 1/2007 |
| DE | 102 55 745 | 6/2004 |
| EP | 0 038 306 | 10/1981 |

(Continued)

*Primary Examiner* — Edward Look
*Assistant Examiner* — Dwayne J White
(74) *Attorney, Agent, or Firm* — Wood, Herron & Evans, L.L.P.

(57) ABSTRACT

A plain bearing assembly for mounting a blade to a hub of a wind turbine includes an outer member mountable to one of the blade or hub, and an inner member mountable to the other of the blade or hub and movable relative to the outer member. The plain bearing further includes fluid cavities associated with one of the outer or inner member and arranged to confront the other of the outer or inner member. The fluid cavities are coupled to a pressure source for establishing a pressurized fluid film between the inner and outer members. A method includes monitoring at least one parameter of the fluid film, comparing the at least one parameter to a threshold criteria, and altering a dynamic state of the wind turbine and/or altering the state of the blade bearing assembly if the threshold criteria is exceeded.

15 Claims, 7 Drawing Sheets

FOREIGN PATENT DOCUMENTS

| | | |
|---|---|---|
| EP | 1 365 147 | 11/2003 |
| EP | 1 367 273 | 12/2003 |
| EP | 1 538 332 | 6/2005 |
| EP | 1 544 504 | 8/2009 |
| EP | 2 189 672 | 5/2010 |
| GB | 1 448 120 | 10/1977 |
| GB | 2 273 746 | 6/1994 |
| SU | 1320550 | 6/1987 |
| WO | 2008/052525 | 5/2008 |
| WO | 2008/113318 | 9/2008 |
| WO | 2010/035011 | 4/2010 |
| WO | 2011/003482 | 1/2011 |

* cited by examiner

PLAIN BEARING FOR A WIND TURBINE BLADE AND METHOD OF OPERATING A WIND TURBINE HAVING SUCH A PLAIN BEARING

TECHNICAL FIELD

This application relates generally to wind turbines and, more particularly, to a plain bearing design for rotatably mounting a wind turbine blade to a hub of a wind turbine.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor that is supported in the nacelle. The rotor is coupled either directly or indirectly with a generator, which is housed inside the nacelle. The rotor includes a central hub and a plurality of blades (e.g., three blades) mounted thereto and extending radially therefrom. The blades may rotate relative to the hub so as to pitch the blades into or out of the wind.

A typical modern wind turbine has many moving parts that facilitate converting the kinetic energy of the wind into electrical energy. As such, a wind turbine typically includes many bearings that provide relative movement between adjacent parts in a relatively efficient, low-friction manner. For example, in many wind turbines the wind turbine blades are rotatably mounted to the hub so that a pitch mechanism may be used to control the pitch of the blades (e.g., rotate the blades about their longitudinal axis) relative to the wind direction and thereby optimize the operation of the wind turbine.

Conventionally, such blade bearings are configured as roller element bearings characterized by having a structural element disposed between the two components that are moving relative to one another. For example, a conventional blade bearing may include an outer race mounted to the rotor hub, an inner race mounted to the wind turbine blade, and a plurality of ball bearings disposed between the two races for supporting the loads and providing generally low-friction, relative movement between the blade and hub. Roller element bearings fail for any number of reasons, but ultimately their life is limited by surface fatigue and wear. Such limited-life components require regular maintenance so as to avoid larger scale failure modes. The replacement parts and maintenance for such limited-life components increase the overall costs of operating a wind turbine.

While roller element bearings are adequate for their intended purpose, manufacturers continually strive to improve the design, operating costs, and functionality of wind turbines. More particularly, wind turbine and bearing manufacturers strive for improved or alternate designs that extend the operating life of bearings, including blade bearings.

SUMMARY

Embodiments in accordance with the invention address these and other deficiencies in conventional blade bearing assemblies. In this regard, a plain bearing assembly for mounting a rotor blade to a rotor hub of a wind turbine includes an outer member configured to be mounted to one of the blade or the hub of the wind turbine and having an annular cavity, and an inner member configured to be mounted to the other of the blade or the hub of the wind turbine and positioned in the annular cavity so that the inner and outer members are movable relative to each other. The plain bearing further includes a plurality of fluid cavities associated with one of the outer or inner member, wherein the fluid cavities confront the other of the outer or inner member. The fluid cavities are configured to be operatively coupled to a fluid supply and a pressure source for establishing a pressurized fluid film between the inner and outer members. The fluid film is, in turn, configured to support the loading of the blades so as to maintain separation of the inner and outer members, but yet allow relative movement therebetween.

In one embodiment, the plain bearing assembly includes a plurality of pads coupled to one of the outer or inner member, the fluid cavities being defined in a surface of the pads that confronts the other of the outer or inner member. The pads may be generally arcuate in shape and may further be movably coupled to one of the outer or inner member, such as via a spring. The pads are configured to accommodate a longitudinal loading of the blades. To accommodate a radial loading of the blades, the plain bearing assembly may further include a support shell generally disposed between the inner and outer members. Ideally, the support shell is formed from a low-friction material that minimizes resistance to relative movement between the outer and inner members.

In one embodiment, the inner member is formed as an annular ring having an inner surface, an outer surface, an upper surface and a lower surface. The inner surface may include a plurality of teeth configured to cooperate with a pitch mechanism for moving one of the outer or inner member relative to the other. The outer member may also be formed as an annular ring having an outer wall, an upper wall coupled to the outer wall, and a lower wall coupled to the outer wall, wherein the outer, upper, and lower walls form a boundary of the annular cavity. In an exemplary embodiment, at least one pad may be coupled to the lower surface of the upper wall and at least one pad may be coupled to the upper surface of the lower wall. Additionally, the inner member may be configured to be mounted to the rotor blade and the outer member may be configured to be mounted to the rotor hub.

In another embodiment, a wind turbine includes a tower, a nacelle located adjacent a top of the tower, a rotor having a hub and a plurality of blades extending therefrom and configured to interact with the wind to rotate the rotor, and a blade bearing assembly for rotatably mounting the blades to the hub. The blade bearing assembly may be configured as a plain bearing assembly including an outer member configured to be mounted to one of the blade or the hub of the wind turbine and having an annular cavity, and an inner member configured to be mounted to the other of the blade or the hub of the wind turbine and positioned in the annular cavity so that the inner and outer members are movable relative to each other. The plain bearing further includes a plurality of fluid cavities associated with one of the outer or inner member, wherein the fluid cavities confront the other of the outer or inner member. The wind turbine may further include a pitch system for rotating the blades relative to the hub and a pump for pressurizing the fluid film between the inner and outer members of the blade bearing assembly.

In a further embodiment, a method of operating a wind turbine having a blade bearing assembly including an outer member coupled to one of a rotor blade or hub, an inner member coupled to the other of the rotor blade or hub, and a fluid film separating the outer and inner members, the wind turbine also having at least one sub-system capable of altering the dynamic state of the wind turbine, includes monitoring at least one parameter of the fluid film indicative of a load on a blade; comparing the at least one parameter to a threshold criteria; and performing at least one of the following steps when the at least one parameter meets the threshold criteria: i) altering the dynamic state of the wind turbine to reduce the load on the blade; and ii) altering the state of the blade bearing assembly so as to better accommodate the load on the blade. In one embodiment, monitoring at least one parameter of the fluid film includes monitoring a pressure of the fluid film, a temperature of the fluid film, and/or a thickness of the fluid film. In one embodiment, altering the dynamic state of the wind turbine may further include yawing the nacelle relative to the tower; pitching the blades; and/or applying a brake to slow the speed of the rotor. Moreover, in one embodiment, altering the state of the bearing assembly so as to better accommodate the load on the blade includes increasing the pressure of the fluid film.

In yet another embodiment, a control system for a wind turbine includes a controller operatively coupled to the blade bearing assembly and at least one sub-system capable of altering a dynamic state of the wind turbine, and at least one sensor for monitoring at least one parameter of the fluid film indicative of a load on a blade. The at least one sensor is operatively coupled to the controller and configured to send a signal to the controller corresponding to a value in the at least one parameter. The controller is configured to send a signal to the at least one sub-system for altering the dynamic state of the wind turbine so as to reduce the load on the blade when the value of the at least one parameter sent by the at least one sensor satisfies a threshold criteria. Additionally or alternatively, the controller may be configured to send a signal to the blade bearing assembly for altering the state of the blade bearing assembly so as to better accommodate the load on the blade when the value of the at least one parameter sent by the at least one sensor satisfies the threshold criteria.

In still a further embodiment, a wind turbine includes a tower; a nacelle located adjacent a top of the tower; a rotor having a hub and a plurality of blades extending therefrom and configured to interact with the wind to rotate the rotor; a blade bearing assembly for rotatably mounting the blades to the hub, the blade bearing assembly including a plain bearing assembly having an outer member coupled to one of the rotor blade or hub, an inner member coupled to the other of the rotor blade or hub, and a fluid film separating the inner and outer members; at least one sub-system capable of altering the dynamic state of the wind turbine; and a control system having a controller operatively coupled to the blade bearing assembly and the at least one sub-system capable of altering a dynamic state of the wind turbine, and at least one sensor for monitoring at least one parameter of the fluid film indicative of a load on a blade.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
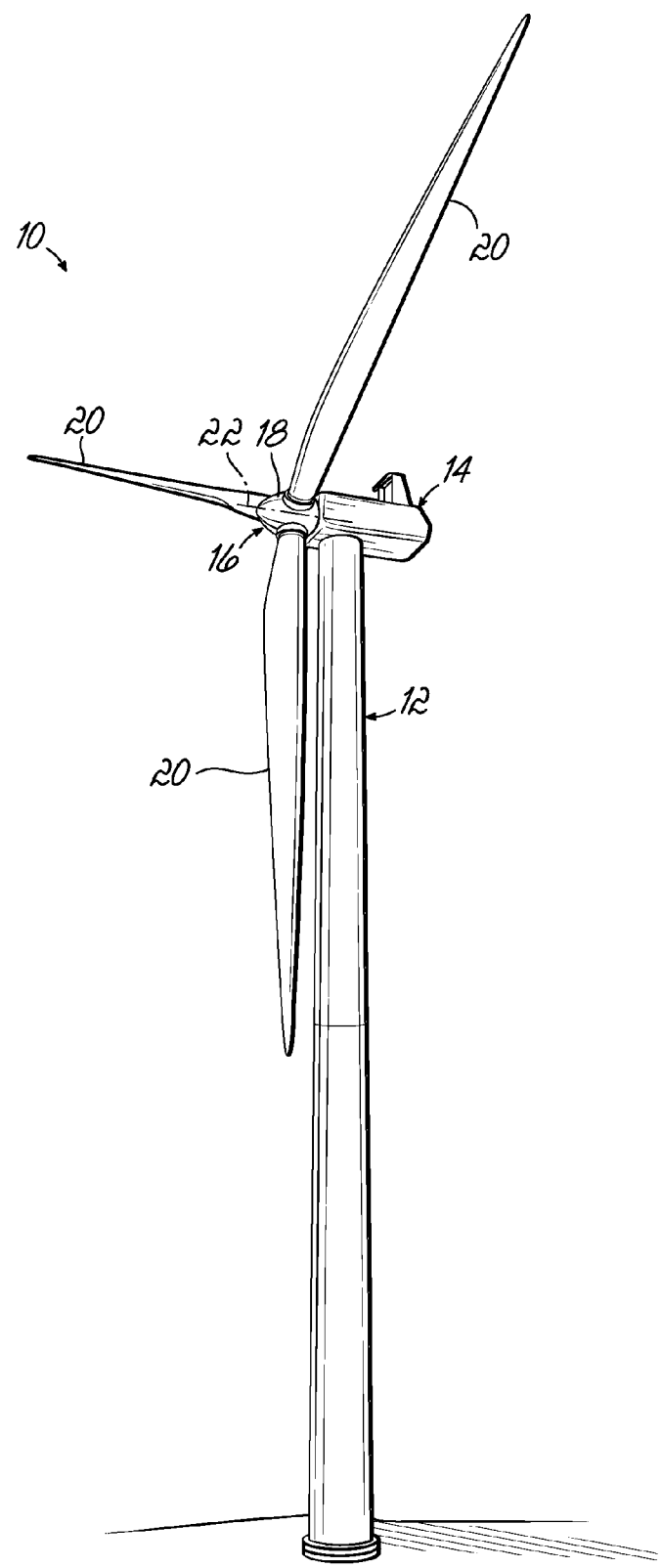
FIG. 1 is a diagrammatic perspective view of a wind turbine.
Figure 2:
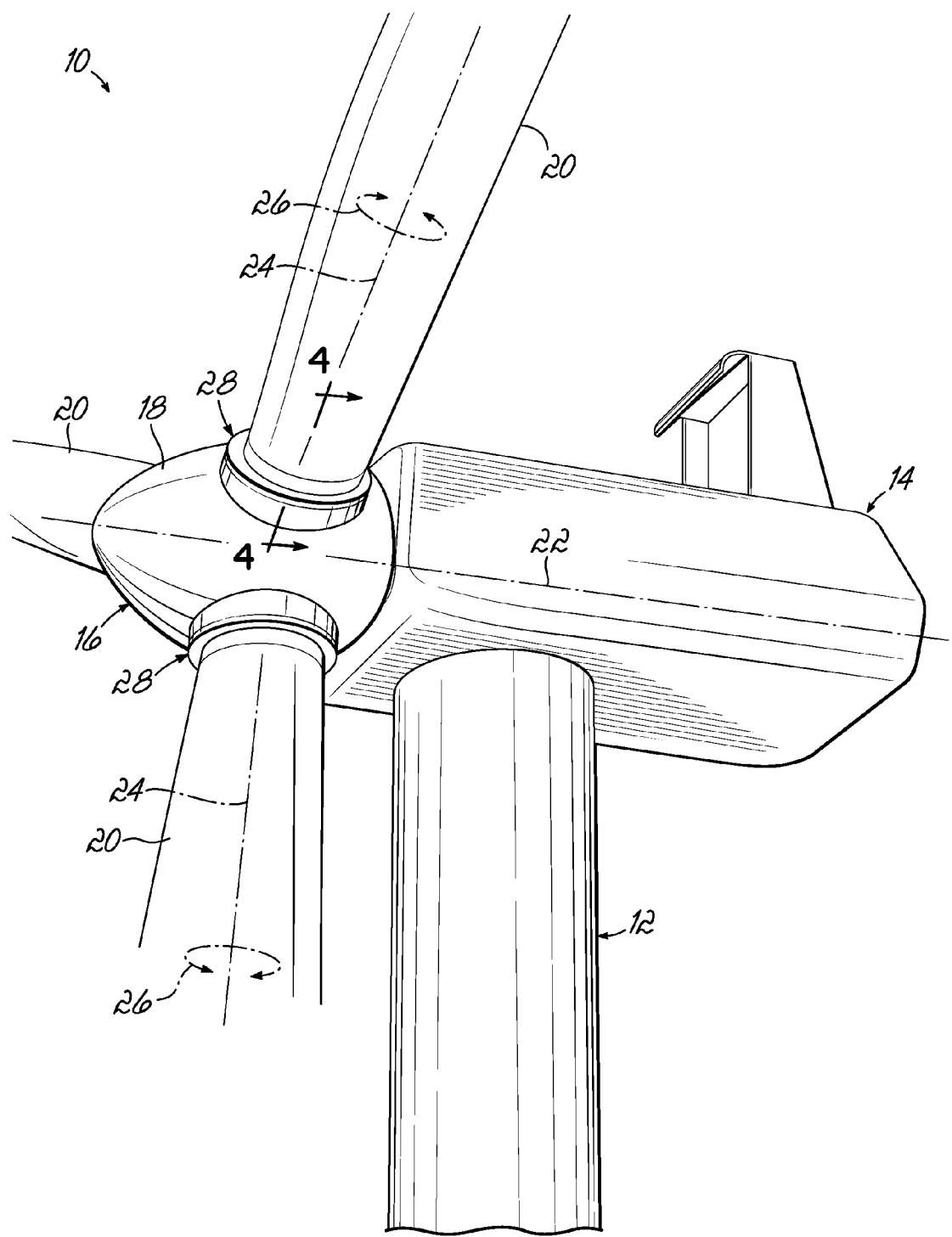
FIG. 2 is an enlarged perspective view of a portion of the wind turbine of FIG. 1.

With reference to FIGS. 1 and 2 and in accordance with an embodiment of the invention, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. The rotor 16 of wind turbine 10 includes a central hub 18 and a plurality of blades 20 that project outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a longitudinal axis 22. The design and construction of the blades 20 are familiar to a person having ordinary skill in the art and will not be further described in detail.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

In accordance with an embodiment of the invention, the blades 20 are mounted to the hub 18 so as to be rotatable about a blade longitudinal axis 24 generally extending in the long direction of the blade (e.g., in a direction from the blade root to its tip), as illustrated by arrow 26 in FIG. 2. In this regard, the wind turbine 10 includes a blade bearing assembly, generally shown at 28, that facilitates the rotatable mounting of the blades 20 to the hub 18. In one aspect of the invention, the blade bearing assembly 28 is not of the roller element type, which is conventional, but is designed as a plain bearing.

More particularly, in an exemplary embodiment, the blade bearing assembly 28 is characterized as a hydrostatic plain bearing.

Generally speaking, plain bearings have an increased operating life relative to roller element bearings. The main reason for this is that, unlike roller element bearings, plain bearings do not have structural elements disposed between the two relative moving components for supporting the loads and facilitating low-friction movement. Instead, plain bearings generally have a fluid film disposed between the two relative moving components for supporting the loads and facilitating relative movement. Thus, the wear and fatigue issues associated with roller elements, as well as the costs associated with their replacement and maintenance, may be avoided. Consequently, plain bearings represent an attractive alternative to roller element bearings. Additionally, plain bearings are designed to eliminate or minimize surface-to-surface contact and thus may operate with even lower friction, which may further increase efficiency.

There are two primary types of plain bearings: hydrostatic bearings and hydrodynamic bearings, each typically having an outer member defining an opening closely fitted around an inner member and a fluid film between the inner and outer members. In a hydrodynamic bearing, the rotation of the inner member self-pressurizes the fluid film in a wedge between confronting surfaces of the members so as to support the load and maintain separation of the inner and outer members. Unless the inner member is rotating with sufficient speed, the fluid film may not be able to fully support the load and maintain the inner and outer members separate from each other. In this case, the hydrodynamic bearing does not operate in a full-film condition, but instead operates in a boundary condition, wherein the load is partially carried by the fluid film and partially carried by direct surface contact with the outer member. Operating a hydrodynamic bearing in a boundary condition can cause wear or damage that may significantly shorten the operating life of the bearing.

Hydrostatic bearings, on the other hand, include an external pump that pressurizes the fluid film around the inner member (independent of the particular dynamics of the inner member) to support the load and maintain the inner member separate from the outer member, even when the inner member is rotating slowly or not at all relative to the outer member. To effectuate external pressurization of the fluid film, hydrostatic bearings typically include a number of pockets or cavities typically formed in a confronting surface, which pockets are supplied with lubricating fluid (e.g., oil, grease, etc.) from an external reservoir and pressurized by an external pump.

As applied to blade bearing assemblies, under normal operating conditions of wind turbine 10, there is relatively small and/or intermittent relative movement between the blades 20 and the hub 18. In this regard, for the most part, the position of the blades 20 relative to the hub 18 is generally fixed. However, from time to time, there may be a need to move the blades 20 relative to the hub 18. For example, this would most commonly occur when adjusting the pitch of the blades 20 by, for example, rotating the blades 20 about axis 24. Thus, as implemented, blade bearing assemblies typically lack sufficient dynamic conditions necessary to support a hydrodynamic plain bearing design. Thus, to gain the benefits of plain bearings in various embodiments of the present invention, blade bearing assembly 28 may be configured as a hydrostatic plain bearing.

Figure 3:
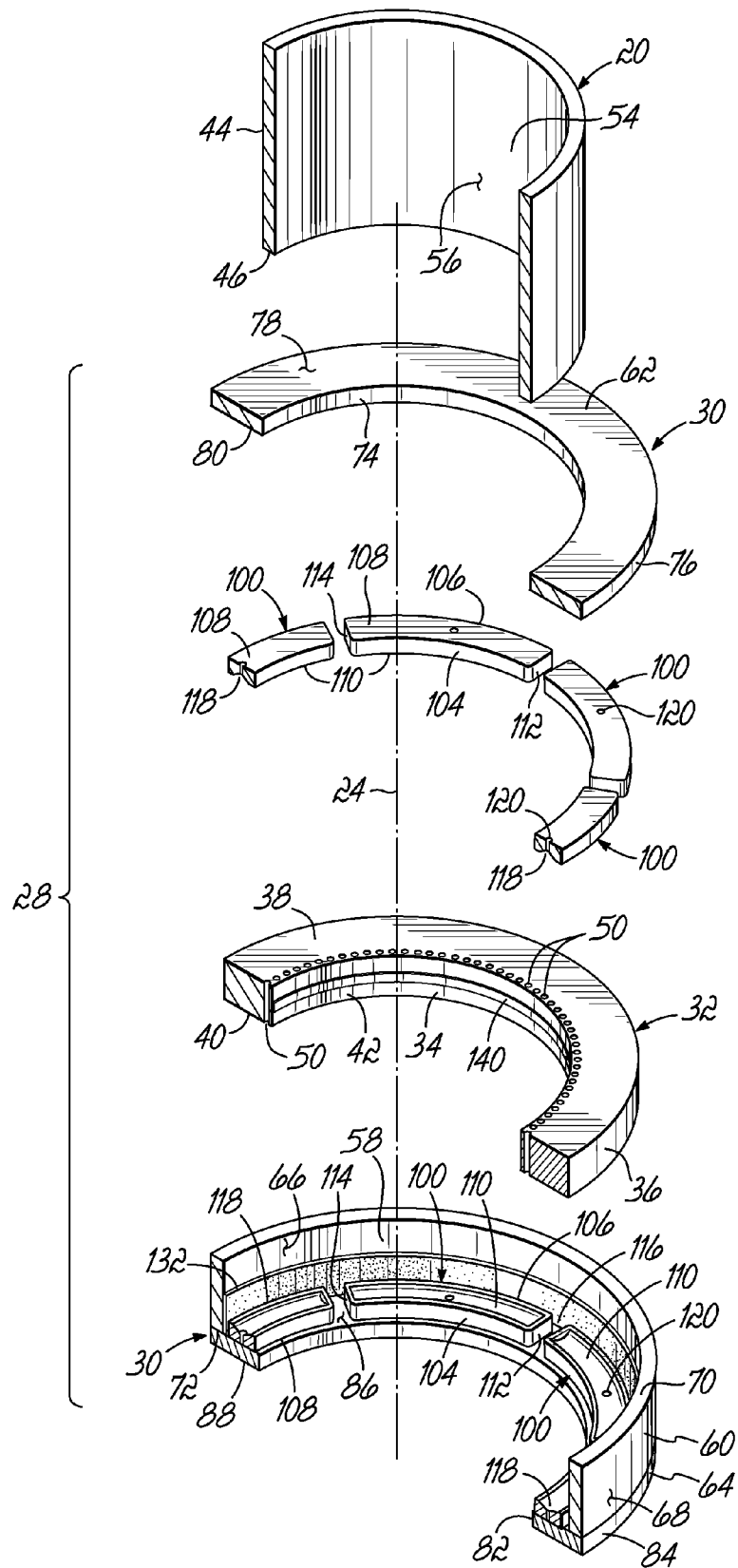
FIG. 3 is a disassembled perspective view of a blade bearing assembly in accordance with an embodiment of the invention.
Figure 4:
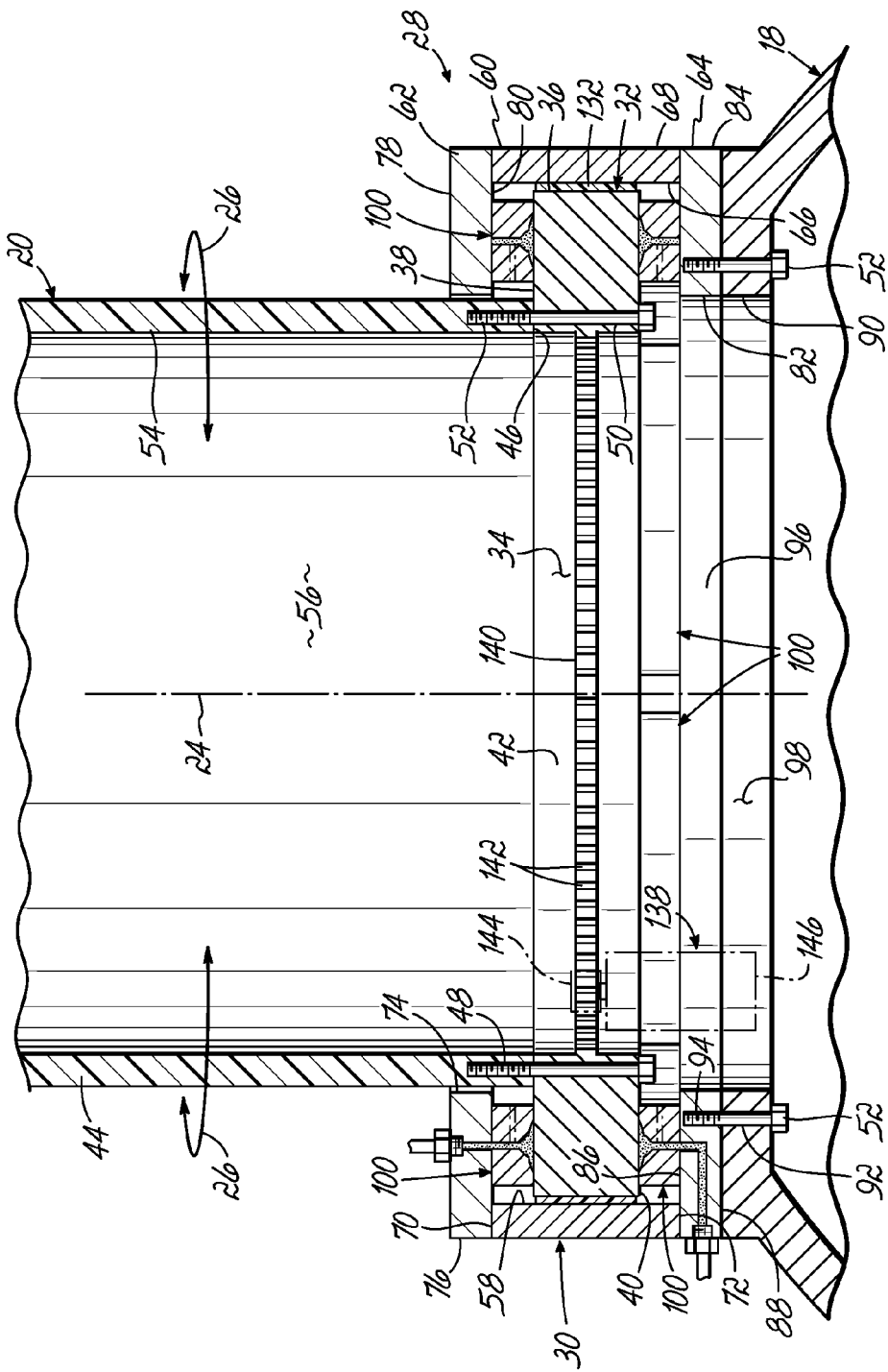
FIG. 4 is a cross-sectional view of the blade bearing assembly shown in FIG. 2 taken generally along the line 4-4.
Figure 5:
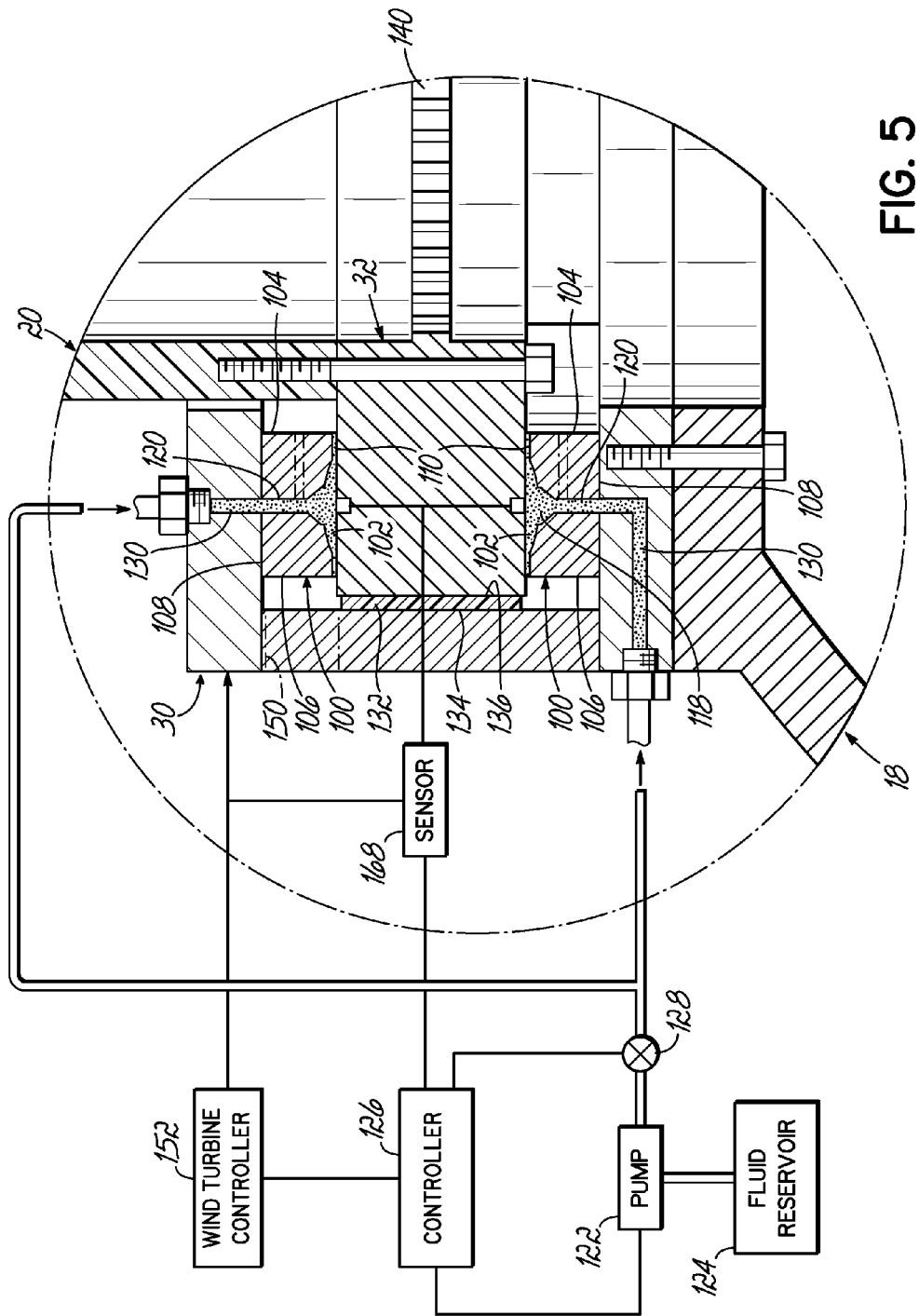
FIG. 5 is an enlarged cross-sectional view of a portion of the blade bearing assembly shown in FIG. 4.

FIGS. 3 and 4 illustrate an exemplary embodiment of a blade bearing assembly 28 configured as a plain bearing, and more particularly, as a hydrostatic plain bearing. In this regard, blade bearing assembly 28 includes an outer member 30 and an inner member 32 that is movable relative to the outer member 30. For example, and as will be discussed in greater detail below, the inner member 32 is capable of rotating relative to the outer member 30 such as about axis 24. In the exemplary embodiment, the outer member 30 is configured to be coupled to the rotor hub 18 and the inner member 32 is configured to be coupled to a blade 20 of the wind turbine 10. It should be recognized, however, that in alternative embodiments, the outer member 30 may be coupled to the blade 20 and the inner member 32 may be coupled to the rotor hub 18 (not shown). In accordance with the blade bearing assembly 28 being configured as a plain bearing, the outer and inner members 30, 32 are separated by an externally pressurized fluid film (FIG. 5).

The inner member 32 may be configured as an annular ring (e.g., generally circular in plan view) that is, in one embodiment, substantially solid and generally rectangular in cross section. The invention is not so limited as the inner member 32 may alternatively be hollow and/or have other cross-sectional shapes. In any event, the inner member 32 generally includes an inner surface 34, an outer surface 36 generally opposed to inner surface 34, an upper surface 38 extending between inner and outer surfaces 34, 36, and a lower surface 40 also extending between inner and outer surfaces 34, 36, and generally opposed to upper surface 38. The inner surface 34 defines a central opening 42 in the inner member 32, as illustrated in the figures. The inner member 32 may be formed from any suitable material including various metals, such as steel. It should be appreciated that the terms inner, outer, upper and lower are used herein to facilitate a full and complete description and understanding of aspects of the present invention and do not limit the invention to any particular reference frame and/or orientation. Those of ordinary skill in the art will understand and appreciate aspects of the invention independent of orientation, reference frame, and use of these particular descriptive terms.

As mentioned above, in one embodiment, the inner member 32 is configured to be coupled to a wind turbine blade 20. In this regard, the blade 20 has a generally cylindrical root end 44 that defines an end face 46 having a plurality of blind, threaded bores 48 formed therein. The inner member 32 also includes a plurality of throughbores 50 adjacent to, but slightly outward of inner surface 34 that generally align with the bores 48 in the root end 44 of blade 20 when the blade 20 is positioned adjacent the inner member 32. A fastener 52, such as a threaded bolt or the like, may be inserted into the throughbores 50 via, for example, the lower surface 40 in order to secure the blade 20 to the inner member 32. In one embodiment, the cross dimension of central opening 42 may correspond to the cross dimension of an opening 54 defined in root end 44 such that the inner surface 34 of inner member 32 generally aligns with an inner surface 56 of the root end 44 of blade 20. Other arrangements are, however, possible. For example, in an alternative embodiment, the inner surface 34 may be inward of the inner surface 56 of the root end 44 (e.g., a smaller central opening 42 in inner member 32) or vice versa. Thus, the particular configuration shown in the figures is not limiting.

Turning now to the outer member 30, the outer member 30 is also configured as an annular ring (e.g., generally circular in plan view), but which has a generally C-shaped cross-sectional profile that defines an annular cavity 58 configured to receive the inner member 32 therein (FIG. 4). In this regard, the outer member 30 includes an outer wall 60, an upper wall 62 coupled to an upper end of the outer wall 60, and a lower wall 64 coupled to a lower end of the outer wall 60 and generally opposed to upper wall 62. The outer member 30 includes no inner wall and is therefore open along an inner aspect thereof that provides access to the annular cavity 58 and provides the outer member 30 with its C-shaped profile.

In an exemplary embodiment, the outer wall 60 is generally circular in plan view and rectangular in cross section, and therefore generally includes an inner surface 66, an outer surface 68 generally opposed to inner surface 66, an upper surface 70 extending between inner and outer surfaces 66, 68, and a lower surface 72 also extending between inner and outer surfaces 66, 68 and generally opposed to upper surface 70. The upper wall 62 has a plate or disk-like configuration and includes an inner surface 74, an outer surface 76 generally opposed to inner surface 74, an upper surface 78 extending between inner and outer surfaces 74, 76, and a lower surface 80 also extending between inner and outer surfaces 74, 76 and generally opposed to upper surface 78. The lower wall 64 is similar to upper wall 62 and includes an inner surface 82, an outer surface 84 generally opposed to inner surface 82, an upper surface 86 extending between inner and outer surfaces 82, 84, and a lower surface 88 also extending between inner and outer surfaces 82, 84 and generally opposed to upper surface 86.

The upper wall 62 may be coupled to the outer wall 60 adjacent the outer surface 76 thereof such that the outer surfaces 68, 76 are generally aligned and the upper wall 62 projects inwardly of the outer wall 60. Similarly, the lower wall 64 may be coupled to the outer wall 60 adjacent the outer surface 84 thereof such that outer surfaces 68, 84 are generally aligned and the lower wall 64 projects inwardly of the outer wall 60. In this way, the upper wall 62, outer wall 60, and lower wall 64 define three bounding sides of the annular cavity 58. In one embodiment, the upper and lower walls 62, 64 may include throughbores and the upper and lower surfaces 70, 72 of the outer wall 60 may include threaded bores for receiving threaded fasteners or the like that securely couple the walls together (not shown). Each of the outer wall 60, upper wall 62, and lower wall 64 may be formed of a suitable material, including, for example and without limitation, steel or other metals.

As mentioned above, in one embodiment, the outer member 30 may be configured to be coupled to the hub 18 of wind turbine 10. In this regard, the hub 18 includes an opening 90 and a plurality of throughbores 92 spaced about and adjacent to the opening 90. The outer member 30, and more particularly the lower wall 64 thereof, also includes a plurality of blind, threaded bores 94 open to the lower surface 88 thereof that generally align with the throughbores 92 in the hub 18 when the outer member 30 is positioned adjacent the hub 18. A fastener 52, such as a threaded bolt or the like, may be inserted into the throughbores 92 via, for example, the interior of the hub 18 in order to secure the outer member 30 to the hub 18. In one embodiment, the cross dimension of opening 90 may correspond to the cross dimension of an opening 96 defined by the inner surface 82 of the lower wall 64 such that the inner surface 82 of lower wall 64 generally aligns with an inner surface 98 that defines opening 90 in hub 18. Other arrangements are, however, possible and the inner surfaces 82, 98 do not have to be aligned with each other.

To implement the plain bearing aspect of the present invention, in one embodiment, the outer member 30 includes a plurality of pads, generally shown at 100, each capable of establishing and/or maintaining a fluid film 102 for supporting the inner member 32 within the outer member 30 in a substantially non-contact manner, but allowing relative movement therebetween (FIG. 5). As illustrated in the figures, the lower surface 80 of the upper wall 62 includes at least one, and preferably a plurality of pads 100 coupled thereto and the upper surface 86 of the lower wall 64 also includes at least one, and preferably a plurality of pads 100 coupled thereto. As shown, there are six pads 100 on each of the lower surface 80 and the upper surface 86. It should be recognized, however, that fewer or more pads 100 may be coupled to the lower and upper surfaces 80, 86 depending on the specific application. It should also be recognized that the lower and upper surfaces 80, 86 may have the same number of pads 100 or have a different number of pads 100 on each surface.

While the embodiment shown in the figures shows the pads 100 coupled to outer member 30, it should be recognized that in an alternative embodiment, the pads 100 may be coupled to inner member 32. More particularly, in such an alternative embodiment, pads 100 may be coupled to the upper and lower surfaces 38, 40 of the inner member 32. Additionally, while the figures illustrate separate pads 100 for establishing and/or maintaining fluid film 102, in yet another alternative embodiment, the pads 100 may be omitted and the fluid film 102 established directly between surfaces of the outer and inner members 30, 32. For example, the fluid pockets or cavities (see below) may be formed directly in the lower surface 80 of the upper wall 62 and the upper surface 86 of the lower wall 64 (not shown). Alternatively, the fluid cavities may be formed directly in the upper and lower surfaces 38, 40 of the inner member 32 (not shown).

In an exemplary embodiment, the construction of each of the pads 100 is substantially the same and a description of one will suffice as a sufficient description of each of the pads 100 in blade bearing assembly 28. In this regard, a pad 100 has a generally arcuate shape and includes a generally arcuate inner surface 104, a generally arcuate outer surface 106, an engaging surface 108 configured to be coupled to the appropriate surface of the upper or lower walls 62, 64, a bearing surface 110 opposed to the engaging surface 108 and facing away from the surface to which the pad 100 is coupled and confronting the inner member 32, and a pair of spaced apart end surfaces 112, 114. The pads 100 may be coupled to the lower surface 80 of the upper wall 62 such that the inner surfaces 104 of the pads 100 are outward of the inner surface 74 of the upper wall 62, and the outer surfaces 106 are inward of the inner surface 66 of the outer wall 60. Similarly, the pads 100 may be coupled to the upper surface 86 of the lower wall 64 such that the inner surfaces 104 of the pads 100 are outward of the inner surface 82 of the lower wall 64 and the outer surfaces 106 are inward of the inner surface 66 of the outer wall 60. Additionally, a gap 116 may exist between adjacent pairs of pads 100, the size of which depends on the number and length of the pads 100 used in blade bearing assembly 28.

Each of the pads 100 includes a fluid pocket or cavity 118 formed in the bearing surface 110 so as to confront or be open to the inner member 32. In the alternative embodiment, wherein the pads 100 are coupled to the inner member 32, the fluid cavities 118 may be arranged so as to confront or be open to the outer member 30, and more particularly, the surfaces 80, 86 thereof (not shown). The cavity 118 may have various configurations including, for example and without limitation, a rectangular configuration, a curved or arcuate configuration, or a wedge configuration, each of which is described in more detail in co-owned U.S. application Ser. Nos. 12/883, 695 and 12/883,702, each of which is incorporated by reference herein in its entirety. Each cavity 118 may have a depth, such as a maximum depth or an average depth, of about 2 mm. Of course, the depth of cavity 118 may vary depending on the particular application, but is generally expected to be about 2 mm or greater. Each pad 100 includes at least one port 120 open to the cavity 118 in bearing surface 110. Port 120 operates as a high pressure port for introducing fluid to the blade bearing assembly 28 and pressurizing the fluid film 102 (exaggerated in the figures for illustrative purposes). In this regard, the at least one fluid port 120 may be operatively coupled to a pressure generating device, such as a pump, schematically shown at 122, configured to pressurize the fluid film 102. The pump 122 should be rated so as to sufficiently pressurize the fluid film 102 to a level that supports the load on the inner member 32 in extreme scenarios, such as for example, a stand still condition or other high load dynamic conditions.

The pump 122 may be operatively coupled to a fluid supply or reservoir 124 for providing a supply of the fluid that forms the fluid film 102 between the bearing surface 110 of the pads 100 and the inner member 32 during operation. As illustrated in FIG. 5, the pump 122 may be operatively coupled to a controller, schematically shown at 126, for controlling the operation of the pump 122 and therefore pressurization of fluid film 102. The controller 126 may be an individual controller dedicated to controlling the pump 122. Alternatively, the controller 126 may be part of a larger control system for controlling the overall operation of the wind turbine 10. A valve, shown schematically at 128, may be disposed in the line coupling the high pressure port 120 and the pump 122 so as to selectively isolate the fluid film 102 in the blade bearing assembly 28 from the pump 122. The valve 128 may be operatively coupled to the controller 126 for selectively opening and closing the valve 128. It should be recognized that each pad 100 may be operatively coupled to its own dedicated pump 122, reservoir 124, and valve 128. Alternatively, the pads 100 may collectively be operatively coupled to a single pump 122, reservoir 124, and valve 128.

In one embodiment, the port 120 in the pads 100 may also be open to the engaging surface 108 thereof, which is, in turn, in fluid communication with a flow channel 130 in the upper and lower walls 62, 64 of outer member 30. Additionally or alternatively, the port 120 may be open to the inner surface 104 of the pads 100 (shown in phantom in FIG. 4). Such an alternative port provides another option for accessing the pads 100 with a fluid supply conduit. The pads 100 may be formed of any suitable material including, for example and without limitation, a composite material, a metal, a plastic material, or a combination thereof. Additionally, in one embodiment, the pads 100 may be secured to the lower and upper surfaces 80, 86 of upper and lower walls 62, 64, respectively, using suitable fasteners such as threaded bolts or the like (not shown). As discussed in more detail below, however, other arrangements are possible.

The assembled blade bearing assembly 28 in accordance with an exemplary embodiment is shown in FIGS. 4 and 5. In this regard, the inner member 32 is positioned in the annular cavity 58 of outer member 30 such that the outer surface 36 of inner member 32 confronts the inner surface 66 of the outer wall 60; the upper surface 38 of the inner member 32 confronts the lower surface 80 of the upper wall 62; and the lower surface 40 of the inner member 32 confronts the upper surface 86 of the lower wall 64. More particularly, when assembled, the upper surface 38 of the inner member 32 confronts the bearing surface 110 of the pads 100 mounted on the lower surface 80 of the upper wall 62, and the lower surface 40 of the inner member 32 confronts the bearing surface 110 of the pads 100 mounted on the upper surface 86 of the lower wall 64.

In use, the pump 122 may be activated, such as by controller 126, so as to establish a pressurized fluid film 102 between the bearing surface 110 of the pads 100 on each side of the inner member 32 and the upper and lower surfaces 38, 40 of the inner member 32. As explained above, due to this external pressurization, the fluid film 102 is capable of supporting the load on the inner member 32 independent of the hydrodynamic forces, if any, developed in the fluid film 102. Consequently, surface-to-surface contact between the outer and inner members 30, 32 may be substantially avoided by fluid film 102. It should be noted that the loading of the inner member 32 is expected to be primarily in the axial or longitudinal direction (i.e., primarily directed along axis 24). Thus, the blade bearing assembly 28 is configured such that the pads 100 and the resulting fluid film 102 support the longitudinal loading of the inner member 32, such as by blade 20. However, the blade bearing assembly 28 may also be configured to accommodate some radial loading as well.

Due to the expectation that the radial loading will not be relatively significant, as compared to the longitudinal loading, a different approach may be taken to accommodate the radial loading of the inner member 32. In this regard, the inner surface 66 of the outer wall 60 may include a radial bearing support shell 132 coupled thereto and configured to support the radial loading of the inner member 32. In one embodiment, the support shell 132 may be configured as an annular band having an outer surface 134 thereof coupled to the inner surface 66 of the outer wall 60, such as with fasteners, bonding agents, etc., and an inner surface 136 configured to confront the outer surface 36 of the inner member 32. The support shell 132 is configured to be formed from a suitable low-friction material that not only provides support in a radial direction, but also provides for low-frictional rotation of the inner member 32 within the outer member 30. By way of example and without limitation, the support shell 132 may be formed from polytetrafluoroethylene (PTFE) or other suitable, low-friction materials capable of withstanding the expected radial loads imposed thereon.

As mentioned above, for the most part, the position of the inner member 32 (and thus, for example, blade 20) is fixed relative to the outer member 30 (and thus, for example, hub 18). Nevertheless, the pressurized fluid film 102 of blade bearing assembly 28 supports the primary loading of the inner member 32 and allows the rotor 16 to function in its intended manner (i.e., the fluid film 102 substantially maintains the separation of the outer and inner members 30, 32). Additionally, however, when it is desirable to move the inner member 32 relative to the outer member 30, the blade bearing assembly 28 allows for such relative movement therebetween. For example, the wind turbine 10 may include a blade pitch system, schematically shown in phantom at 138 in FIG. 4, for adjusting the pitch of the blades 20 relative to the wind direction (and relative to hub 18). In this regard, the inner surface 34 of the inner member 32 may be configured to cooperate with a pitch mechanism for rotating the inner member 32 relative to the outer member 30. More particularly, the inner surface 34 of the inner member 32 may include a rib 140 having a plurality of teeth 142 configured to mate with a toothed gear 144 operatively coupled to a pitch control motor 146. The pitch control motor 146 may be coupled to a controller, such as controller 126 or a wind turbine controller (discussed in more detail below), for controlling the pitch of the blades 20. It should be recognized that the pitch system 138 may include a plurality of pitch motors 146 operatively coupled to toothed rib 140 for pitching blades 20 and is not limited to the particular configuration shown herein.

Figure 6:
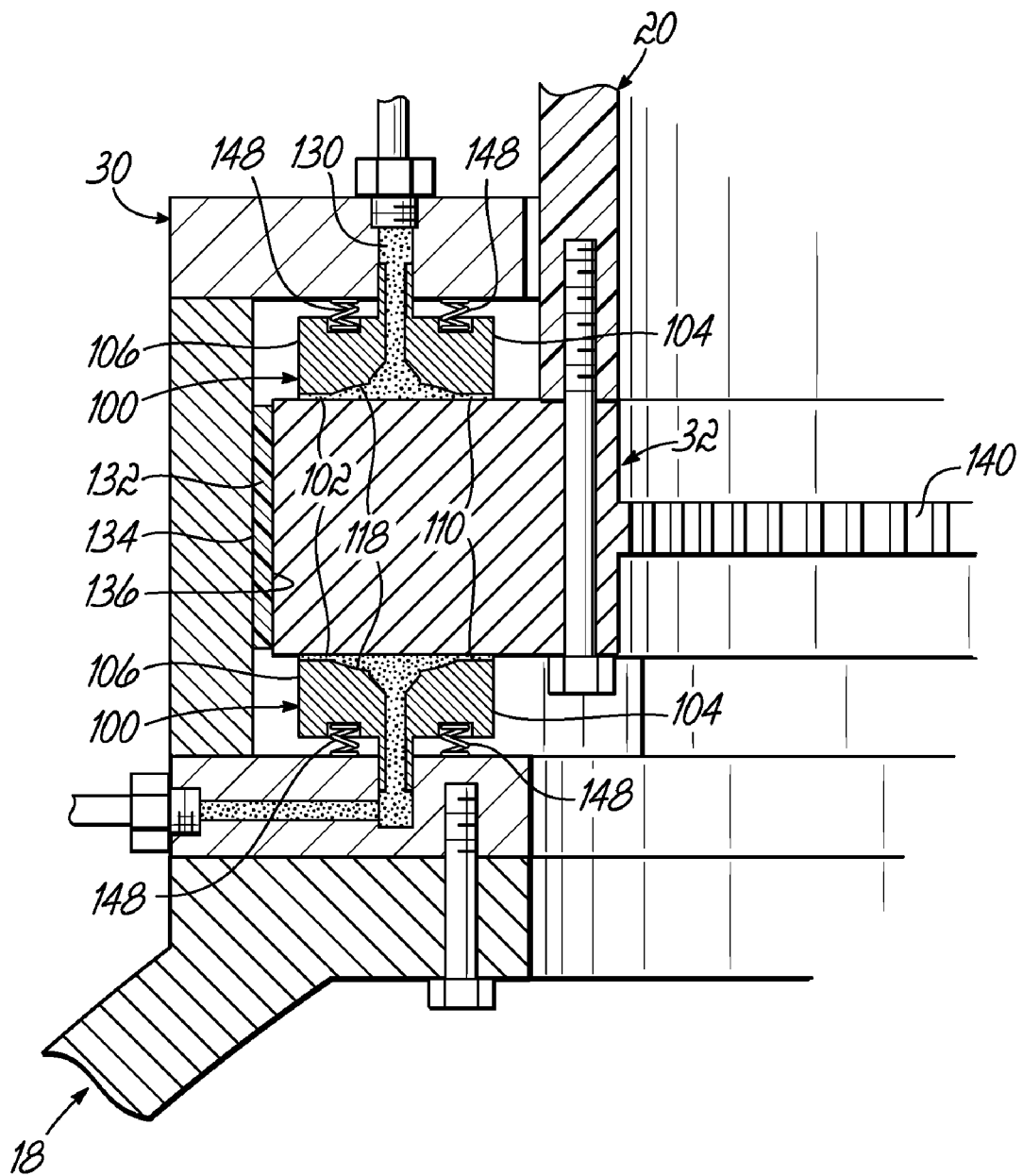
FIG. 6 is an enlarged cross-sectional view similar to FIG. 5 in accordance with an alternative embodiment of the invention.

In the embodiment shown in FIG. 5, the pads 100 may be fixedly secured to the surfaces 80, 86 of the outer member 30, such as with a threaded fastener or the like (not shown). As such, the pads 100 may not be movable relative to the supporting surfaces 80, 86 of the outer member 30. FIG. 6, in which like reference numerals refer to like features in FIG. 5, illustrates an alternative embodiment wherein the pads 100 are movably coupled to surfaces 80, 86 of the outer member 30. More particularly, the pads 100 may be mounted to surfaces 80, 86 of outer member 30 so as to be biased toward the inner member 32. In one embodiment, the biasing force may be provided by one or more springs 148 on each of the pads 100 for coupling the pads 100 to surfaces 80, 86 of the outer member 30. Other biasing mechanisms, including, for example, pneumatic or hydraulic actuators, may also be possible for generating a biasing force on the pads 100 toward the inner member 32.

Such a biasing force on the pads 100 maintains the bearing surface 110 of the pads 100 in close proximity to the confronting surfaces 38, 40 of the inner member 32 so that the fluid film 102 is not disrupted during operation (e.g., maintain the pressure within fluid film 102). Additionally, the movable coupling of the pads 100 to the outer member 30 provides a self-alignment feature to the blade bearing assembly 28. In this regard, for example, if a blade 20 were slightly misaligned in regard to its coupling to the hub 18, the ability of the pads 100 to move slightly would, in turn, allow the blade bearing assembly 28 to more readily accommodate the misalignment. This aspect allows the blade bearing assembly 28 to be more robust in its implementation.

In one aspect in accordance with embodiments of the invention, components of the blade bearing assembly 28 may be configured to be replaceable in a relatively quick and convenient manner. In this regard, the replacement of conventional roller element blade bearing assemblies often requires that the blade 20 be completely removed from the hub 18. This then requires a crane and other heavy-duty equipment to effectuate the blade bearing replacement. As a result, the replacement of conventional blade bearings is often time consuming, labor intensive, and expensive.

In the present design, the pads 100 are configured to be replaceable without removal of the blade 20 from the hub 18. In this regard, the pads 100 on the lower wall 64 may be accessible from inside the hub 18. In order to access the pads 100 on the upper wall 62, a plurality of access openings 150 (shown in phantom in FIG. 5) may be formed in the outer wall 60 of outer member 30. The access openings 150 may be covered by a removable door or hatch, a slidable door, or other removable covering that provides selective access to the annular cavity 58 such that the pads 100 on the upper wall 62 may be replaced. In addition to the pads 100, the support shell 132 may be replaceable via, for example, the access openings 150 in the outer wall 60.

In a further aspect, the wind turbine 10 may include a control system having a wind turbine controller, schematically shown at 152, operatively coupled to the blade bearing assembly 28 for controlling operation of the wind turbine 10 based on certain conditions in the blade bearing assembly 28. In an exemplary embodiment, when potentially damaging or undesirable conditions exist in the blade bearing assembly 28, the controller 152 may be configured to change the dynamic state of the wind turbine 10 or additionally or alternatively modify a feature or characteristic of the blade bearing assembly 28 itself so as to reduce the likelihood of damage to the blade bearing assembly 28. In this way, the operating life of the blade bearing assembly 28 may be extended.

To this end, the wind turbine controller 152 may be operatively coupled to one or more sub-systems (having controllers which may be separate or integrated within controller 152) effective to alter the dynamic state of the wind turbine 10. By way of example and without limitation, the controller 152 may be operatively coupled to: i) a yaw controller (not shown) for controlling the yaw of the rotor 16 about tower 12; ii) a pitch controller (not shown) for controlling the pitch of the blades 20 relative to the wind direction; and/or iii) a brake system (not shown) for resisting the rotation of the rotor 16 about the longitudinal axis 22. These various sub-systems have the capability of affecting the dynamic state of wind turbine 10. More particularly, and as discussed in more detail below, these sub-systems have the ability to affect the loading on the blades 20, which, in turn, affects operation of the blade bearing assembly 28. The sub-systems provided above are exemplary and those of ordinary skill in the art may recognize other sub-systems that affect the dynamic state of the wind turbine 10. In addition to the above, the wind turbine controller 152 may be further operatively coupled to the blade bearing assembly 28 and capable of affecting the state of the blade bearing assembly 28 so as to better accommodate the loads on the blades 20.

Figure 7:
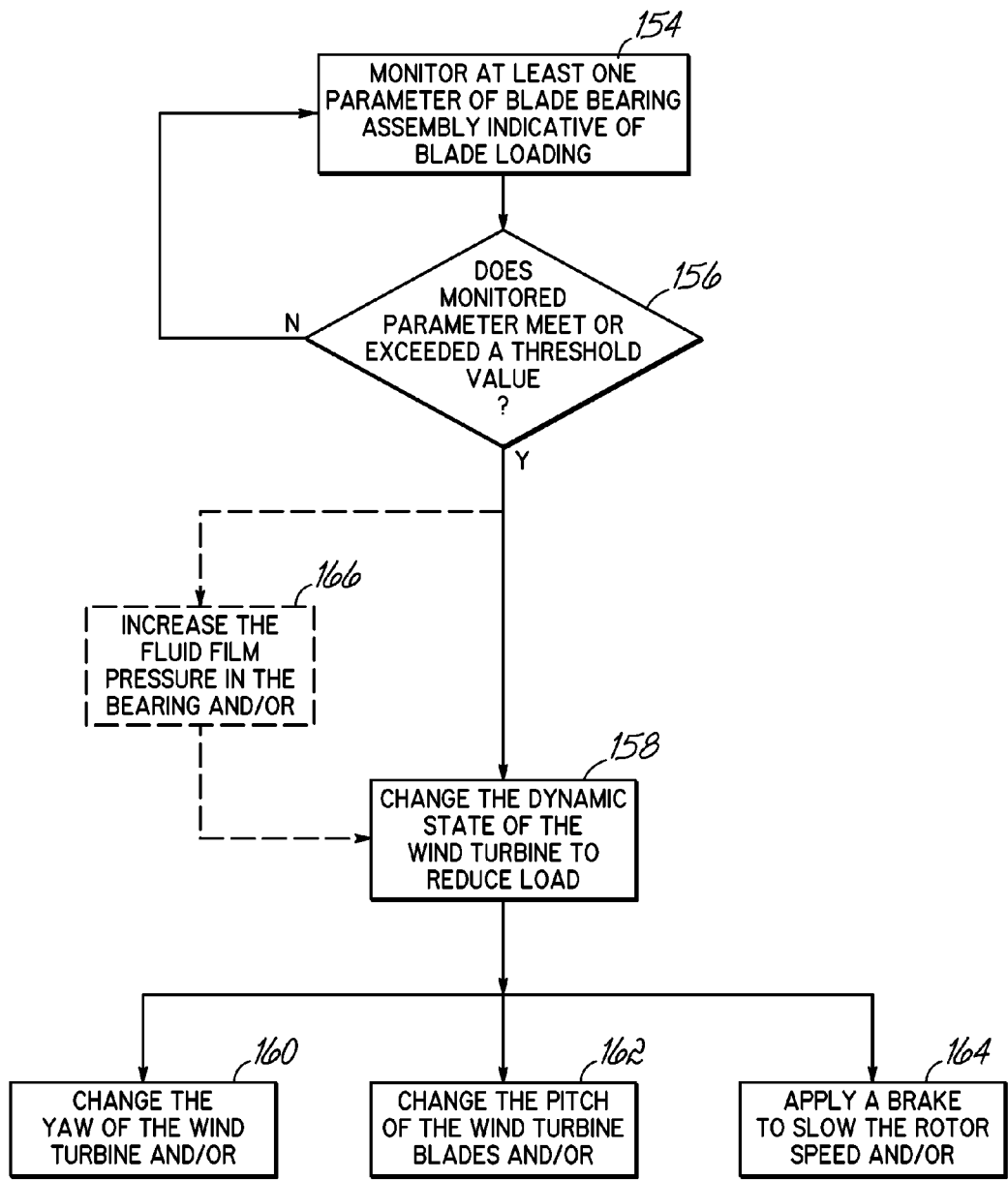
FIG. 7 is a flow chart illustrating a method of operating a wind turbine in accordance with an embodiment of the invention.

In accordance with an aspect of the invention, and in reference to FIG. 7, the controller 152 may monitor one or more parameters associated with operation of the blade bearing assembly 28, as in step 154. In an exemplary embodiment, the monitored parameter(s) is generally indicative of the loads applied to the blades; several examples of which are described in greater detail below. The monitored parameter(s) is then compared to a threshold value(s) stored in controller 152, as in step 156. If the monitored parameter(s) is less than the threshold value(s) then the wind turbine 10 continues to operate without intervention from this particular control system. If, on the other hand, the monitored parameter(s) meets or exceeds the threshold value(s), then the controller 152 is configured to alter the operation of the wind turbine 10 so as to reduce the load on the blades 20, and/or change the operating condition of blade bearing assembly 28 so as to more readily accommodate the load on the blades 20.

If the threshold value(s) is exceeded, then the controller 152 may be configured to alter the dynamic state of the wind turbine 10 to reduce the load on the blade, as indicated at 158. In this regard, the controller 152 may be configured to yaw the rotor 16 relative to the tower 12 so as to turn the rotor 16 out of the wind, as indicated at 160. Additionally or alternatively, the controller 152 may be configured to pitch the rotor blades 20 out of the wind so as to reduce the driving force of the rotor 16, and thus the loading of the blades 20, as at 162. Still further additionally or alternatively, the controller 152 may be configured to apply a brake and thereby slow the angular velocity of the rotor 16, as at 164. Those of ordinary skill in the art may recognize other ways to reduce the loading on the blades 20 upon reaching threshold value(s) in the monitored parameter(s) and embodiments of the invention are not limited to those identified above. In any event, altering the dynamic state of the wind turbine 10 in such a manner is configured to prevent or reduce the likelihood of damaging the blade bearing assembly 28 and shortening its operating life.

Because the blade bearing assembly 28 is configured as a hydrostatic plain bearing, another option is available. In this regard, and as further illustrated in FIG. 7, if the threshold value(s) is exceeded, then the controller 152 may be configured to increase the pressurization of the fluid film 102 between the outer and inner members 30, 32 of blade bearing assembly 28, as indicated at step 166, so that the blade bearing assembly 28 may better accommodate the load on the blades 20. This may be achieved, for example, by increasing the output of the pump 122. Similar to the above, altering the pressurization of the fluid film 102 in the blade bearing assembly 28 is configured to prevent or reduce the likelihood of damaging the blade bearing assembly 28 and shortening its operating life.

In one embodiment, various techniques may be implemented wherein one or more properties of the fluid film 102 may be monitored to provide an indication of the load on the blades 20. In this regard, one or more sensors, schematically illustrated at 168 (FIG. 5), may be in communication with the fluid film 102 between the pads 100 and the inner member 32 for monitoring at least one property of the fluid film 102. The sensors 168 may further be operatively coupled to controller 152 for affecting the operation of the wind turbine 10 in the event a potentially damaging or undesirable condition may exist in the blade bearing assembly 28.

In one embodiment, the property of the fluid film 102 being monitored by sensors 168 is the pressure. In this regard, the sensors 168 may be pressure transducers capable of measuring the pressure of the fluid film 102 at certain locations, which may be selected by locating one or more suitable ports in the pads 100 and/or the inner member 32. Such pressure transducers are generally known in the art and are commercially available. Thus, a detailed description of the pressure transducers is considered unnecessary. The pressure transducers are operatively coupled to the controller 152 and are configured to send a pressure signal indicative of the load on the blades 20. If the pressure, as indicated by the pressure transducer, exceeds a threshold value, then operation of the wind turbine 10 may be altered by changing the dynamic state of the wind turbine 10 or by pressurization of the fluid film 102, as was more fully explained above.

In another embodiment, the property of the fluid film 102 being monitored by sensors 168 is the temperature. In this regard, the sensors 168 may be temperature sensors capable of measuring the temperature of the fluid film 102 at certain locations, which may be selected by locating one or more suitable ports in the pads 100 and/or the inner member 32. Such temperature sensors are generally known in the art and are commercially available. Thus, a detailed description of the temperature sensors is considered unnecessary. The temperature sensors are operatively coupled to the controller 152 and are configured to send a temperature signal indicative of the load on the blades 20. If the temperature, as indicated by the temperature sensors, exceeds a threshold value, then operation of the wind turbine 10 may be altered by changing the dynamic state of the wind turbine 10 or by pressurization of the fluid film 102, as explained above.

In still a further embodiment, the property of the fluid film 102 being monitored by sensors 168 is the film thickness. In this regard, the sensors 168 may be film thickness sensors or proximity sensors capable of measuring or indicating the thickness of the fluid film 102 at certain locations. For example and without limitation, the film thickness sensors may operate on an inductive or capacitive theory (e.g., proximity sensors). Such sensors are generally known in the art and are commercially available. Thus, a detailed description of the types of sensors is considered unnecessary. Other sensors operating on a host of other principles or theories may also be used. The proximity sensors are operatively coupled to the controller 152 and are configured to send a distance signal indicative of the load on the blades 20. If the film thickness, as indicated by the proximity sensors, exceeds a threshold value (e.g., drops below a threshold value), then operation of the wind turbine 10 may be altered by changing the dynamic state of the wind turbine 10 or by increased pressurization of the fluid film 102, as was more fully explained above.

By monitoring the load on the blades 20, then operation of the wind turbine 10 during conditions potentially harmful to the blade bearing assembly 28 may be avoided. Such a control system should increase the operating life of the blade bearing assembly 28 and therefore, reduce the replacement and maintenance costs associated with the overall operation of the wind turbine 10.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, while embodiments have been described having a plurality of discrete pads 100, it should be realized that a single, circumferentially continuous pad (e.g., an annular ring) having a single circumferentially continuous fluid cavity or a discrete number of fluid cavities may be used. Thus, the invention in its broader aspects is therefore not limited to the specific details, representative methods, and illustrative examples shown and described. Accordingly, departures may be made from such details without departing from the spirit or scope of the general inventive concept.

What is claimed is:

1. A plain bearing assembly for mounting a rotor blade to a rotor hub of a wind turbine, comprising:
    an outer member configured to be mounted to one of the blade or the hub of the wind turbine and including an annular cavity;
    an inner member configured to be mounted to the other of the blade or the hub of the wind turbine and positioned in the annular cavity so that the inner and outer members are movable relative to each other;
    a plurality of fluid cavities associated with one of the outer or inner member, the cavities confronting the other of the outer or inner member,
    wherein the fluid cavities are configured to be operatively coupled to a fluid supply and a pressure source for establishing a pressurized fluid film between the inner and outer members, the fluid film configured to support the loading of the blades so as to maintain separation of the inner and outer members, but yet allow relative movement therebetween.

2. The plain bearing assembly according to claim 1, further comprising a plurality of pads coupled to one of the outer or inner member, the fluid cavities being defined in a surface of the pads that confronts the other of the outer or inner member.

3. The plain bearing assembly according to claim 2, wherein the pads are generally arcuate in shape.

4. The plain bearing assembly according to claim 2, wherein the pads are movably coupled to one of the outer or inner member.

5. The plain bearing assembly according to claim 4, wherein the pads are coupled to one of the outer or inner member by at least one spring, the spring biasing the pads toward the other of the outer or inner member.

6. The plain bearing assembly according to claim 1, further comprising a support shell disposed between the inner and outer member and configured to support at least partial loading of the blade bearing assembly.

7. The plain bearing assembly according to claim 1, wherein the inner member is formed as an annular ring having an inner surface, an outer surface, an upper surface and a lower surface, and the outer member is formed as an annular ring having an outer wall, an upper wall coupled to the outer wall, and a lower wall coupled to the outer wall, the outer, upper and lower walls forming boundaries of the annular cavity.

8. The plain bearing assembly according to claim 7, wherein the inner surface of the inner member includes a plurality of teeth configured to cooperate with a pitch mechanism for moving one of the outer or inner member relative to the other of the outer or inner member.

9. The plain bearing assembly according to claim 7, wherein at least one pad is coupled to a lower surface of the upper wall and at least one pad is coupled to an upper surface of the lower wall.

10. A wind turbine, comprising:
a tower;
a nacelle located adjacent a top of the tower;
a rotor having a hub and a plurality of blades extending therefrom and configured to interact with the wind to rotate the rotor;
a blade bearing assembly for rotatably mounting the blades to the hub, the blade bearing assembly comprising a plain bearing assembly, comprising:
    an outer member configured to be mounted to one of the blade or the hub of the wind turbine and including an annular cavity;
    an inner member configured to be mounted to the other of the blade or the hub of the wind turbine and positioned in the annular cavity so that the inner and outer members are movable relative to each other; and
    a plurality of fluid cavities associated with one of the outer or inner member, the cavities confronting the other of the outer or inner member,
    wherein the fluid cavities are configured to be operatively coupled to a fluid supply and a pressure source for establishing a pressurized fluid film between the inner and outer members, the fluid film configured to support the loading of the blades so as to maintain separation of the inner and outer members, but yet allow relative movement therebetween; and
a pitch system for rotating a blade relative to the hub.

11. The wind turbine according to claim 10, further comprising a pump for pressurizing the fluid film between the outer and inner members of the blade bearing assembly.

12. A method of operating a wind turbine having a blade bearing assembly including an outer member coupled to one of a rotor blade or hub, an inner member coupled to the other of the rotor blade or hub, and a fluid film separating the outer and inner members, the wind turbine also having at least one sub-system capable of altering a dynamic state of the wind turbine, comprising:
    monitoring at least one parameter of the fluid film indicative of a load on the blade;
    comparing the at least one parameter to a threshold criteria; and
    performing at least one of the following steps when the at least one parameter meets the threshold criteria: i) altering the dynamic state of the wind turbine to reduce the load on the blade; and ii) altering the state of the blade bearing assembly so as to better accommodate the load on the blade.

13. The method according to claim 12, wherein monitoring at least one parameter of the fluid film further comprises at least one of monitoring a pressure of the fluid film, monitoring a temperature of the fluid film, and monitoring a thickness of the fluid film.

14. The method according to claim 12, wherein altering the dynamic state of the wind turbine to reduce the load on the blade further comprises at least one of: i) yawing the nacelle relative to the tower; ii) pitching the blades of the wind turbine; and iii) applying a brake to slow the speed of the rotor.

15. The method according to claim 12, wherein altering the state of the bearing assembly so as to better accommodate the load on the blade further comprises increasing the pressure in the fluid film.

* * * * *